United States Patent
Lin et al.

(10) Patent No.: US 8,149,824 B2
(45) Date of Patent: Apr. 3, 2012

(54) METHOD AND SYSTEM FOR IMPLEMENTING SERVICE TRIGGERED BY OFF-HOOK

(75) Inventors: Hongda Lin, Guangdong (CN); Tianyu Yang, Guangdong (CN)

(73) Assignee: Huawei Technologies Co., Ltd., Shenzhen (CN)

(*) Notice: Subject to any disclaimer, the term of this patent is extended or adjusted under 35 U.S.C. 154(b) by 1410 days.

(21) Appl. No.: 11/668,532

(22) Filed: Jan. 30, 2007

(65) Prior Publication Data
US 2007/0201658 A1    Aug. 30, 2007

(30) Foreign Application Priority Data
Feb. 28, 2006   (CN) .......................... 2006 1 0058041

(51) Int. Cl.
H04L 12/66 (2006.01)
H04L 12/28 (2006.01)
H04M 3/42 (2006.01)

(52) U.S. Cl. .................. 370/356; 370/401; 379/201.1; 379/207.02; 379/207.07; 379/207.14

(58) Field of Classification Search .................. None
See application file for complete search history.

(56) References Cited

U.S. PATENT DOCUMENTS

| | | | |
|---|---|---|---|
| 4,991,199 A * | 2/1991 | Parekh et al. | 379/93.01 |
| 5,859,897 A | 1/1999 | Furman et al. | |
| 5,915,008 A | 6/1999 | Dulman | |
| 7,113,585 B1 * | 9/2006 | Breckenridge | 379/356.01 |
| 7,730,156 B1 * | 6/2010 | Jethwa et al. | 709/217 |
| 2003/0026245 A1 | 2/2003 | Ejzak | |
| 2003/0115138 A1 * | 6/2003 | Brown et al. | 705/40 |
| 2003/0145054 A1 | 7/2003 | Dyke | |
| 2004/0190498 A1 | 9/2004 | Kallio et al. | |
| 2005/0190750 A1 * | 9/2005 | Kafka et al. | 370/352 |
| 2006/0212511 A1 * | 9/2006 | Garcia-Martin | 709/203 |
| 2007/0153770 A1 * | 7/2007 | Goyal et al. | 370/352 |
| 2007/0201658 A1 | 8/2007 | Lin et al. | |

FOREIGN PATENT DOCUMENTS

| | | |
|---|---|---|
| CN | 1514562 A | 7/2004 |
| CN | 101160940 A | 4/2008 |
| CN | 101031004 B | 5/2010 |
| WO | 02/23876 A2 | 3/2002 |

(Continued)

OTHER PUBLICATIONS

European Search Report: dated May 15, 2009; Appl. No./Patent No. 06805125.9-2414 / 1993274 PCT/CN2006002924.

(Continued)

Primary Examiner — Melanie Jagannathan
(74) Attorney, Agent, or Firm — Slater & Matsil, L.L.P.

(57) ABSTRACT

A method for implementing a service triggered by off-hook includes: sending information of a service triggered by off-hook which is subscribed by a user to a service implementing server; carrying out an operation of the service triggered by off-hook according to the information of the service triggered by off-hook when the user is off-hook. The embodiments of the present invention also provide a system for implementing a service triggered by off-hook. In accordance with the embodiments of the present invention, the service implementing server may carry out the operation of the service triggered by off-hook according to a subscription type of the user to implement the service triggered by off-hook.

31 Claims, 3 Drawing Sheets

FOREIGN PATENT DOCUMENTS

WO 2005/006724 A1 1/2005
WO WO 2007098654 A1 9/2007

OTHER PUBLICATIONS

Schulzrinne, H., et al., "RTP Payload for DTMF Digits, Telephony Tones and Telephony Signals," Network Working Group, May 2000, The Internet Society, 30 pages.

Roach, A. B., "Session Initiation Protocol (SIP)—Specific Event Notification," Network Working Group, Jun. 2002, The Internet Society, 38 pages.

Written Opinion of the International Searching Authority, PCT/CN2006/002924, Applicant: Huawei Technologies Co., Ltd., Feb. 22, 2007, 3 pages.

International Searching Report, PCT/CN2006/002924, Feb. 22, 2007, 4 pages.

Communication pursuant to Article 94(3) EPC, Application No. 06 805 125.9 —2414, Applicant: Huawei Technologies Co., Ltd., dated Dec. 23, 2011, 6 pages.

\* cited by examiner

METHOD AND SYSTEM FOR IMPLEMENTING SERVICE TRIGGERED BY OFF-HOOK

FIELD OF THE INVENTION

The present invention relates to the service triggered by off-hook in the communication filed, and in particular, to a method and a system for implementing a service triggered by off-hook.

BACKGROUND OF THE INVENTION

Along with the development of communication techniques, the service triggered by off-hook is used in more and more applications. For example, if a user has registered an instant hot line, a Soft Switch (SS) will automatically dial the hotline number registered by the user to implement the service triggered by off-hook after the user is off-hook. If the user is in a fee-due status, the SS will play for the user a fee-due prompting tone to remind the user of paying for the call timely after the user is off-hook. If there is a shortage of the balance of the calling prepaid account, the SS will play for the user a prompting tone to remind the user of recharging timely after the user is off-hook.

In a Next Generation Network (NGN), since the user generally subscribes to a service on the SS, the information of a service triggered by off-hook which the user has subscribed to is stored in the SS, in this way, the implementation of the service triggered by off-hook is controlled by the SS.

In an IP Multimedia Subsystem (IMS), since the user generally subscribes to a service on an Access Gateway Control Function (AGCF), the information of the service triggered by off-hook which the user has subscribed to is stored in the AGCF. Thus, the AGCF controls the implementation of the service triggered by off-hook.

At present, in the NGN or the IMS network, the service triggered by off-hook is independently implemented by the SS or the AGCF, and the user has to subscribe to the service triggered by off-hook in advance on the SS or the AGCF, so it is impossible to separate the specific service implementation from the service control. Along with the development of communication techniques, an Application Server (AS) for implementing the service control is sure to implement more and more service control functions. Increasing services require to be subscribed on the AS by the users and it has become a trend of the current development of communication techniques to control the implementation of various services by the AS.

However, the information of the service triggered by off-hook which is subscribed by the user can not be transmitted between the existing AS and the SS or the AGCF, as a result, the SS or the AGCF may not acquire the information of the service triggered by off-hook which is subscribed by the user from the AS if the service triggered by off-hook is subscribed on the AS, which makes it impossible to implement the service triggered by off-hook.

SUMMARY OF THE INVENTION

The embodiments of the present invention provide a method and a system for implementing a service triggered by off-hook.

A method for implementing a service triggered by off-hook includes:

sending information of a service triggered by off-hook which is subscribed by a user on an Application Server (AS) to a service implementing server;

carrying out an operation of the service triggered by off-hook according to the information of the service triggered by off-hook when the user is off-hook.

A system for implementing a service triggered by off-hook includes:

an Application Server (AS), for sending information of a service triggered by off-hook which is subscribed by a user;

a service implementing server, for receiving the information of the service triggered by off-hook and carrying out an operation of the service triggered by off-hook according to the information of the service triggered by off-hook when the user is off-hook.

As can be seen from the above technical scheme, the AS may send to the service implementing server information of a service triggered by off-hook which is subscribed by a user. After receiving the information of the service triggered by off-hook, the service implementing server may carry out an operation of the service triggered by off-hook hereby so as to implement the service triggered by off-hook under the mode in which the service and the control are separated.

DETAILED DESCRIPTION OF THE INVENTION

The present invention is further described in detail with reference to accompanying drawings and specific embodiments.

A method for implementing a service triggered by off-hook is provided according to a first embodiment of this invention, which mainly includes the following: a string for carrying information related to a service triggered by off-hook is configured in a Session Initial Protocol (SIP) signaling transmitted between an AS and an SS or between an AS and an AGCF, the AS sends the information of a service triggered by off-hook which is subscribed by a user to a service implementing server via the SIP signaling with the string configured; after receiving the SIP signaling containing the information of the service triggered by off-hook, the service implementing server carries out an operation of the service triggered by off-hook according to a subscription type of the user to implement the service triggered by off-hook under a mode in which the service and the control are separated.

Figure 1:
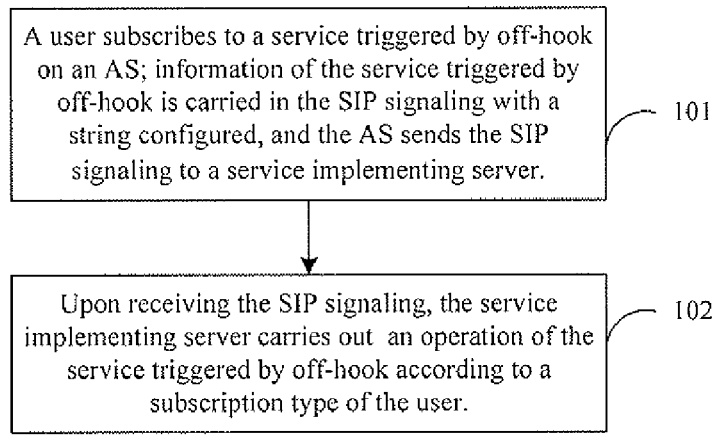
FIG. 1 is a simplified flow chart illustrating a method for implementing a service triggered by off-hook in accordance with a first embodiment of the present invention.

FIG. 1 is a simplified flow chart illustrating a method for implementing a service triggered by off-hook in accordance with the present embodiment. The premise of implementing this embodiment is to configure a string for carrying information related to a service triggered by off-hook in an SIP signaling. As shown in FIG. 1, the method includes the following steps.

Step 101; a user subscribes to a service triggered by off-hook on an AS. Information of the service triggered by off-hook is carried in the SIP signaling with the string configured, and the AS sends the SIP signaling to a service implementing server.

Step 102: upon receiving the SIP signaling, the service implementing server carries out an operation of the service triggered by off-hook according to a subscription type of the user.

Merely by way of an example, the process of configuring the string in an SIP signaling is implemented by adding a string to an Event of the SIP signaling. In detailed implementations, the string is generally added to an Event of a SUBSCRIBE message of the SIP signaling.

In Step 101, when subscribing to the service triggered by off-hook in the AS, the user may subscribe to only a dial tone subscription service or only an automatic dialing subscription service on the AS, or subscribe to both the dial tone subscription service and the automatic dialing subscription service on the AS.

For example, if the user subscribes to only the dial tone subscription service on the AS, dial tone subscription information is carried in the SIP signaling with the string configured, and the AS sends the SIP signaling to the service implementing server. For another example, if the user subscribes to only the automatic dialing subscription service on the AS, automatic dialing subscription information is carried in the SIP signaling with the string configured, and the AS sends the SIP signaling to the service implementing server. For another example, if the user subscribes to both the dial tone subscription service and the automatic dialing subscription service on the AS, the dial tone subscription information and the automatic dialing subscription information is carried in the SIP signaling with the string configured, and the AS sends the SIP signaling to the service implementing server.

The above service implementing server is an SS in the NON network or an AGCF in the IMS network.

In order to illustrate more clearly the method for implementing a service triggered by off-hook in the case that a user subscribes to different services triggered by off-hook, a description is hereinafter given in detail with reference to the accompanying drawings and embodiments.

Figure 2:
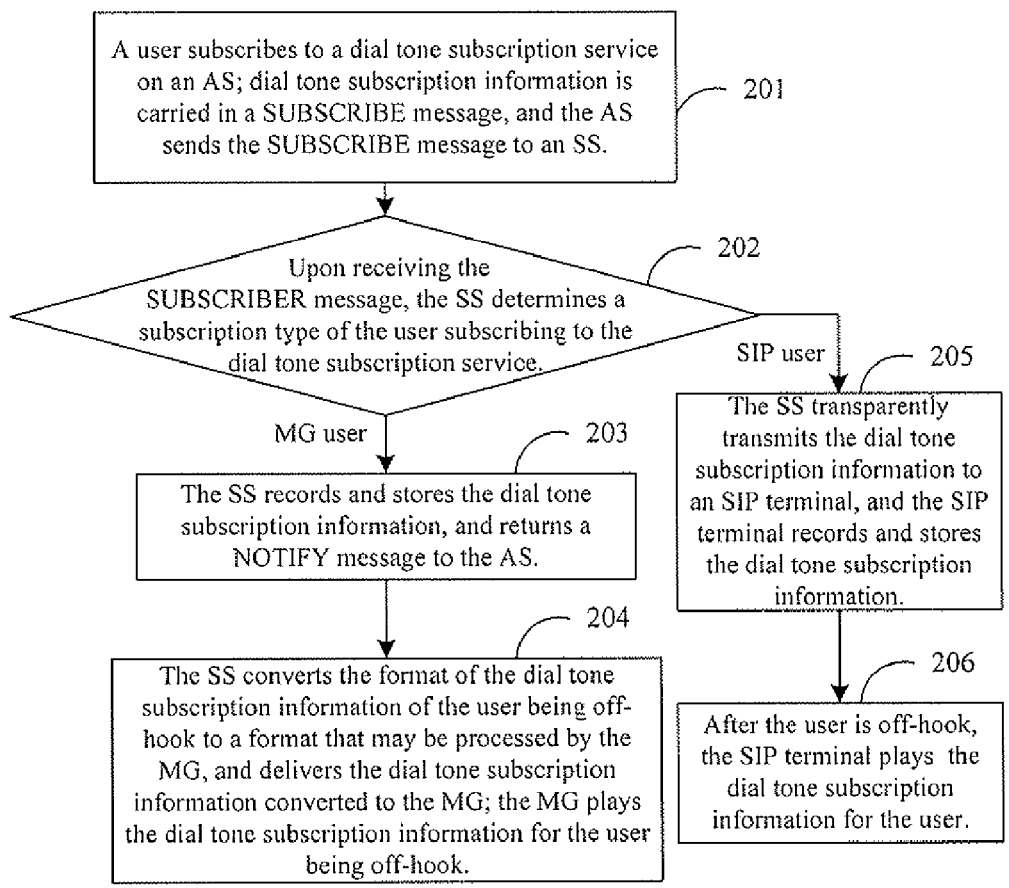
FIG. 2 is a simplified flow chart illustrating a method for implementing a service triggered by off-hook in accordance with a second embodiment of the present invention.

FIG. 2 is a simplified flow chart illustrating a method for implementing a service triggered by off-hook in accordance with a second embodiment of the present invention. In this embodiment, the service implementing server is an SS in NGN. A service triggered by off-hook which is subscribed by a user on an AS is a dial tone subscription service, and a string for carrying dial tone subscription information is added in advance to an Event of a SUBSCRIBE message sent from the AS to the SS. As shown in FIG. 2, the method includes the following steps.

Step 201: the user subscribes to a dial tone subscription service on the AS. The AS writes the dial tone subscription information in the string in the SUBSCRIBE message, and sends the SUBSCRIBE message to the SS.

Step 202: upon receiving the SUBSCRIBER message, the SS determines, according to user configuration data stored by itself which include user type information, that the user who has subscribed to the dial tone subscription service is a Media Gateway (MG) user or an SIP user. If the user is an MG user, proceed with Step 203; if the user is an SIP user, proceed with Step 205.

Step 203: the SS records and saves the dial tone subscription information contained in the SUBSCRIBER message in its own internal data table, and returns a NOTIFY message to the AS.

Step 204: after receiving an off-hook Event reported by the MG, the SS queries the internal data table to acquire the dial tone subscription information of the user being off-hook, converts the format of the dial tone subscription information of the user being off-hook to a format that may be processed by the MG, and delivers the dial tone subscription information converted to the MG via a media control command. The MG plays the dial tone subscription information for the user being off-hook to implement the service triggered by off-hook for the MG user, and then terminate this procedure.

In this step, the format that may be processed by the MG is generally 2883 format.

Step 205: the SS transparently transmits the dial tone subscription information contained in the SUBSCRIBER message to an SIP terminal, and the SIP terminal records and stores the dial tone subscription information in its own database.

Step 206: after the user is off-hook, the SIP terminal plays for the user the dial tone subscription information stored in its own database to implement the service triggered by off-hook for the SIP user.

Figure 3:
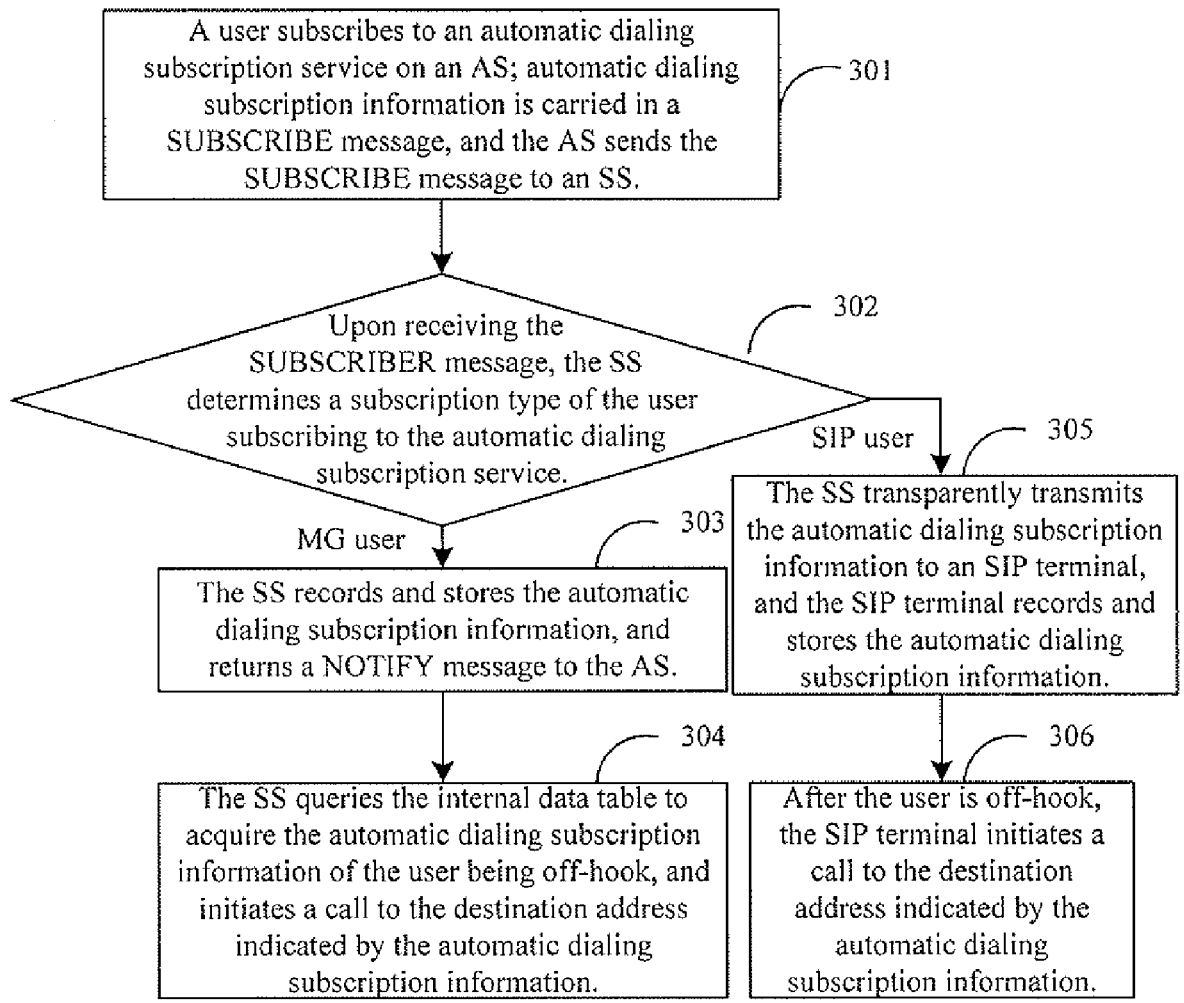
FIG. 3 is a simplified flow chart illustrating a method for implementing a service triggered by off-hook in accordance with a third embodiment of the present invention.

FIG. 3 is a simplified flow chart illustrating a method for implementing a service triggered by off-hook in accordance with a third embodiment of the present invention. In this embodiment, the service implementing server is an SS in the NGN. A service triggered by off-hook which is subscribed by a user on an AS is an automatic dialing subscription service, and a string for carrying automatic dialing subscription information is added in advance to an Event of a SUBSCRIBE message sent from the AS to the SS. As shown in FIG. 3, the method includes the following steps.

Step 301: a user subscribes to an automatic dialing subscription service on the AS; the AS writes the automatic dialing subscription information in the string in the SUBSCRIBE message and sends the SUBSCRIBE message to the SS.

Step 302: upon receiving the SUBSCRIBER message, the SS determines, according to user configuration data stored by itself which include user type information, that the user who has subscribed to the automatic dialing subscription service is an MG user or an SIP user. If the user is an MG user, proceed with Step 303; if the user is an SIP user, proceed with Step 305.

Step 303: the SS records and stores the automatic dialing subscription information contained in the SUBSCRIBER message in its own internal data table, and returns a NOTIFY message to the AS.

Step 304: after receiving an off-hook Event reported by the MG, the SS queries the internal data table to acquire the automatic dialing subscription information of the user being off-hook, initiates a call to a destination address indicated by the automatic dialing subscription information to implement the service triggered by off-hook for the MG user, and then terminate this procedure.

Step 305: the SS transparently transmits the automatic dialing subscription information contained in the SUBSCRIBER message to an SIP terminal, and the SIP terminal records and stores it in its own database.

Step 306: after the user is off-hook, the SIP terminal initiates a call to the destination address indicated by the automatic dialing subscription information to implement the service triggered by off-hook for the SIP user.

Additionally, for the MG user, in the Step 304, when receiving the off-hook Event reported by the MG, the SS may further start a timer and query the internal data table to acquire the automatic dialing subscription information of the user being off-hook. After acquiring the automatic dialing subscription information of the user being off-hook, the SS determines whether the user dials a number before the timer times out. If the user dials a number, the SS initiates a call to the destination address indicated by the number; otherwise, initiates a call to the destination address indicated by the automatic dialing subscription information when the timer times out. In this case, the duration of the timer may be a timeout parameter t contained in the automatic dialing subscription information. The parameter is used for providing a chance for the user to dial actively before the service implementing server initiates a call to the destination address indicated by the automatic dialing subscription information, generally, t=5 s.

Likewise, for an SIP user, in the Step 306, when the user is off-hook, the SIP terminal may further start a timer, query its own database to acquire the automatic dialing subscription information of the user being off-hook, and determines whether the user dials a number before the timer times out. If the user dials a number, the SIP terminal initiates a call to the destination address indicated by the number; otherwise, initiates a call to the destination address indicated by the automatic dialing subscription information when the timer times out.

Figure 4:
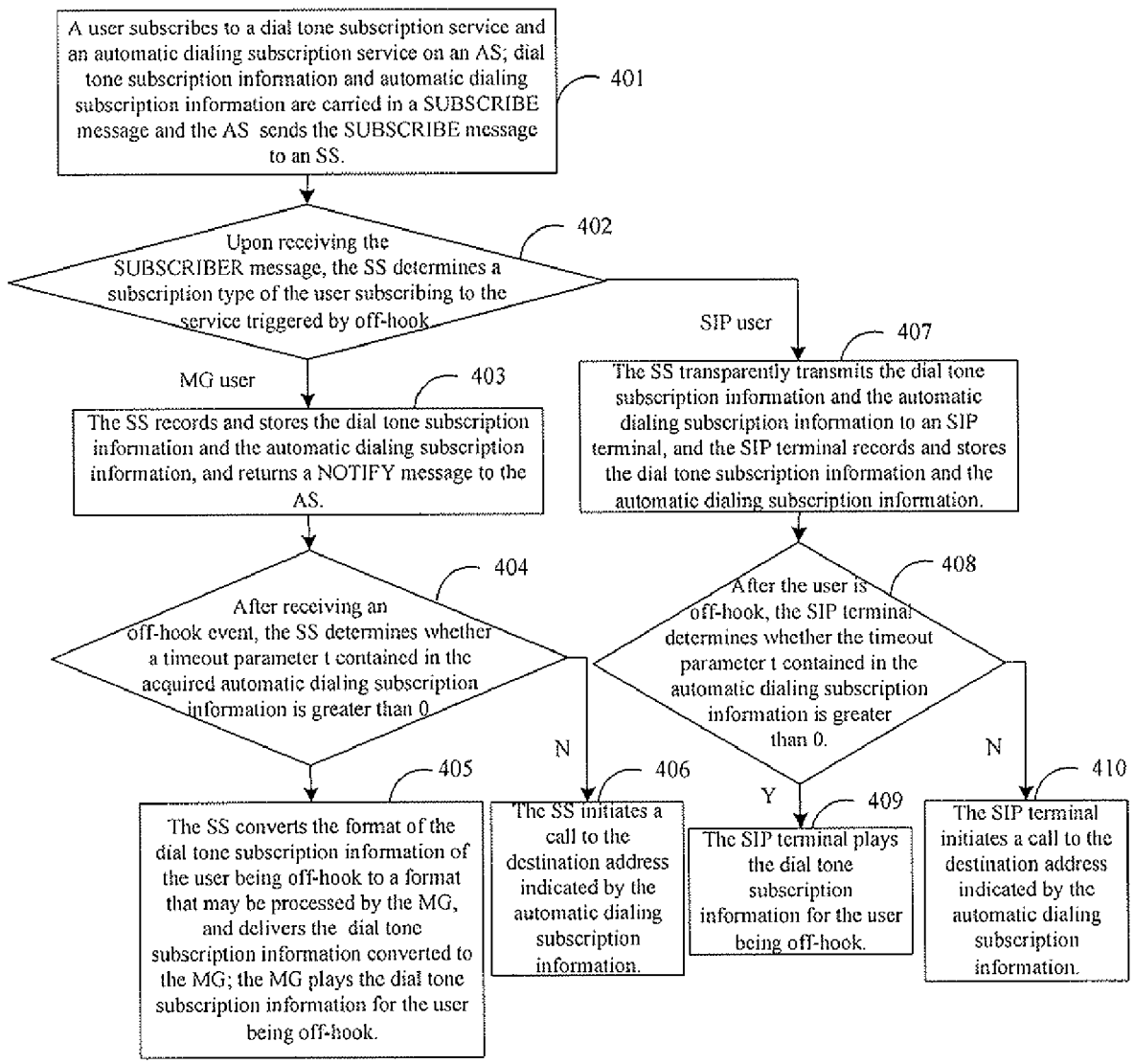
FIG. 4 is a simplified flow chart illustrating a method for implementing a service triggered by off-hook in accordance with a fourth embodiment of the present invention.

FIG. 4 is a simplified flow chart illustrating a method for implementing a service triggered by off-hook in accordance with a fourth embodiment of the present invention. In this embodiment, the service implementing server is an SS in the NGN. A service triggered by off-hook which is subscribed by a user on an AS is a dial tone subscription service and an automatic dialing subscription service, and a string for carrying dial tone subscription information and automatic dialing subscription information is added in advance to an Event of a SUBSCRIBE message sent from the AS to the SS, and the method includes the following steps.

Step 401: a user subscribes to a dial tone subscription service and an automatic dialing subscription service on the AS. The AS writes the dial tone subscription information and the automatic dialing subscription information in the string in the SUBSCRIBE message and sends the SUBSCRIBE message to the SS.

Step 402: upon receiving the SUBSCRIBER message, the SS determines, according to user configuration data stored by itself which include user type information, that the user who has subscribed to the dial tone subscription service and the automatic dialing subscription service is an MG user or an SIP user. If the user is an MG user, proceed with Step 403; if the user is an SIP user, proceed with Step 407.

Step 403: the SS records and stores the dial tone subscription information and the automatic dialing subscription information contained in the SUBSCRIBER message in its own internal data table, and returns a NOTIFY message to the AS.

Step 404: after receiving an off-hook Event reported by the MG, the SS queries the internal data table to acquire the dial tone subscription information and the automatic dialing subscription information of the user being off-hook, and determines whether a timeout parameter t contained in the automatic dialing subscription information is greater than 0. If the parameter is greater than 0, proceed with Step 405; otherwise, proceed with Step 406.

Step 405: the SS converts the format of the dial tone subscription information of the user being off-hook to a format that may be processed by the MG, and delivers the dial tone subscription information converted to the MG via a media control command; the MG plays the dial tone subscription information for the user being off-hook to implement the service triggered by off-hook for the MG user, and then terminate this procedure.

As described above, in this step, the format that may be processed by MG is generally 2883 format.

Step 406: the SS initiates a call to the destination address indicated by the automatic dialing subscription information to implement the service triggered by off-hook for the MG user, and then terminate this procedure.

Step 407: the SS transparently transmits the dial tone subscription information and the automatic dialing subscription information contained in the SUBSCRIBER message to an SIP terminal, and the SIP terminal records and stores them in its own database.

Step 408: after the user is off-hook, the SIP terminal determines whether the timeout parameter t contained in the automatic dialing subscription information is greater than 0. If the parameter is greater than 0, proceed with Step 409; otherwise, proceed with Step 410.

Step 409: the SIP terminal plays the dial tone subscription information for the user being off-hook to implement the service triggered by off-hook for the SIP user, and then terminate this procedure.

Step 410: the SIP terminal initiates a call to the destination address indicated by the automatic dialing subscription information to implement the service triggered by off-hook for the SIP user, and then terminate this procedure.

In this embodiment, the timeout parameter t contained in the automatic dialing subscription information may be further used for determining the order of performing the dial tone subscription service and the automatic dialing subscription service. For example, when the parameter t is greater than 0, the service implementing server may perform the dial tone subscription service and the automatic dialing subscription service in turn, or perform the dial tone subscription service directly without performing the automatic dialing subscription service; when the parameter t is equal to 0, the service implementing server performs the automatic dialing subscription service directly without performing the dial tone subscription service.

In the case that the dial tone subscription service and the automatic dialing subscription service are performed in turn and the timeout parameter t is greater than 0, for the MG user, in the Step 404, when receiving the off-hook Event reported by the MG, the SS may further start a timer and query the internal data table to acquire the automatic dialing subscription information of the user being off-hook, and determines whether the user dials a number before the timer times out. If the user dials a number, the SS stops performing the dial tone subscription service and initiates a call to the destination address indicated by the number; otherwise, the SS stops performing the dial tone subscription service and initiates a call to the destination address indicated by the automatic dialing subscription information when the timer times out. Likewise, for the SIP user, in the Step 408, when the user is off-hook, the SIP terminal may further start a timer and query its own database to acquire the automatic dialing subscription information of the user being off-hook, and determines whether the user dials a number before the timer times out. If the user dials a number, the SIP terminal stops performing the dial tone subscription service and initiates a call to the destination address indicated by the number; otherwise, the SIP terminal stops performing the dial tone subscription service and initiates a call to the destination address indicated by the automatic dialing subscription information when the timer times out. As described above, the duration of the timer may be set as a timeout parameter t contained in the automatic dialing subscription information.

In the above embodiments, the service implementing server is an SS in the NON. In actual applications, the service implementing server may also be an AGCF in the IMS network. Since the function of AGCF in the IMS network is the same as that of SS in the NON, the procedure for implementing a service triggered by off-hook via the AGCF in the IMS network is the same as that via the SS in the NGN except that the SS needs to be replaced by the AGCF, and such circumstances all should be covered in the protection scope of this invention.

The technical scheme and advantages of the present invention have been further described in detail by the above embodiments. It should be appreciated that the foregoing is only embodiments of this invention and is not for use in limiting the invention. Any modification, equivalent substitution, improvement within the spirit and principle of the invention should be covered in the protection scope of the invention.

What is claimed is:

1. A method for implementing a service triggered by off-hook, the method comprising:
    sending, by an Application Server (AS), a SUBSCRIBE message of a Session Initiation Protocol (SIP) signaling to a service implementing server, wherein the SUBSCRIBE message carries information of a service triggered by off-hook, which is subscribed to by a user on the AS, to a service implementing server; and
    carrying out, by the service implementing server, an operation of the service triggered by off-hook according to the information of the service triggered by off-hook when the user is off-hook, wherein said carrying out the operation of the service triggered by off-hook comprises:
    determining, by the service implementing server, that the user who has subscribed to the service triggered by off-hook is an MG user or an SIP user, according to user configuration data stored by the service implementing server, including user type information after receiving the SUBSCRIBE message of the SIP signaling;
    if the user is a Media Gateway (MG) user, recording, by the service implementing server, the information of the service triggered by off-hook carried in the SUBSCRIBER message in its own internal data; and
    if the user is an SIP user, transparently transmitting, by the service implementing server, the information of the service triggered by off-hook carried in the SUBSCRIBER message to an SIP terminal, so that the SIP terminal records the information of the service triggered by off-hook.

2. The method of claim 1, wherein the SUBSCRIBE message of the SIP signaling to the service implementing server comprises:
    configuring a string for carrying information related to a service triggered by off-hook in the SUBSCRIBE message of the SIP signaling; and
    carrying the information of the service triggered by off-hook in the SUBSCRIBE message of the SIP signaling with the string configured and sending the SUBSCRIBE message of the SIP signaling to the service implementing server.

3. The method of claim 2, wherein said configuring the string in the SUBSCRIBE message of the SIP signaling comprises:
    adding the string to an Event of the SUBSCRIBE message of the SIP signaling.

4. The method of claim 1, wherein the information of the service triggered by off-hook comprises dial tone subscription information;
    the user subscribing to the service triggered by off-hook on the AS comprises the MG user;
    said carrying out the operation of the service triggered by off-hook according to the information of the service triggered by off-hook comprises:
    recording the dial tone subscription information in an internal data table; querying the internal data table to acquire the dial tone subscription information of the user being off-hook after receiving an off-hook event reported by an MG; and delivering the dial tone subscription information of the user being off-hook to the MG; and
    playing the dial tone subscription information for the user being off-hook.

5. The method of claim 4, wherein said delivering the dial tone subscription information of the user being off-hook to the MG comprises:
    converting the format of the dial tone subscription information of the user being off-hook to a format that may be processed by the MG, and delivering the dial tone subscription information converted to the MG.

6. The method of claim 1, wherein the information of the service triggered by off-hook comprises dial tone subscription information;
    the user subscribing to the service triggered by off-hook on the AS comprises the SIP user; and
    said carrying out the operation of the service triggered by off-hook according to the information of the service triggered by off-hook comprises:
    transparently transmitting the dial tone subscription information to an SIP terminal;
    recording the dial tone subscription information; and playing the dial tone subscription information to the user after the user is off-hook.

7. The method of claim 1, wherein the information of the service triggered by off-hook comprises automatic dialing subscription information;
    the user subscribing to the service triggered by off-hook on the AS comprises the MG user; and
    said carrying out the operation of the service triggered by off-hook according to the information of the service triggered by off-hook comprises:
    recording the automatic dialing subscription information in an internal data table;
    querying the internal data table to acquire the automatic dialing subscription information of the user being off-hook after receiving an off-hook event reported by the MG; and initiating a call to a destination address indicated by the automatic dialing subscription information.

8. The method of claim 7, wherein the service implementing server further starts a timer when receiving the off-hook event reported by the MG; and
    the method further comprises:
    before initiating the call to the destination address,
    determining whether the user dials a number before the timer times out; if the user dials a number, initiating the call to a destination address indicated by the number; and if the user does not dial a number, initiating the call to the destination address indicated by the automatic dialing subscription information when the timer times out.

9. The method of claim 1, wherein the information of the service triggered by off-hook comprises automatic dialing subscription information;
    the user subscribing to the service triggered by off-hook on the AS comprises the SIP user; and
    said carrying out the operation of the service triggered by off-hook according to the information of the service triggered by off-hook comprises:

transparently transmitting the automatic dialing subscription information to an SIP terminal; recording the automatic dialing subscription information; and initiating a call to a destination address indicated by the automatic dialing subscription information after the user is off-hook.

10. The method of claim 9, wherein the SIP terminal further starts a timer when the user is off-hook; and
the method further comprises:
before initiating the call to the destination address,
determining whether the user dials a number before the timer times out; if the user dials a number, initiating the call to a destination address indicated by the number; and if the user does not dial a number, initiating the call to the destination address indicated by the automatic dialing subscription information when the timer times out.

11. The method of claim 1, wherein the information of the service triggered by off-hook comprises dial tone subscription information and automatic dialing subscription information;
the user subscribing to the service triggered by off-hook on the AS comprises the MG user; and
said carrying out the operation of the service triggered by off-hook according to the information of the service triggered by off-hook comprises:
recording the dial tone subscription information and the automatic dialing subscription information in an internal data table; querying the internal data table to acquire the dial tone subscription information and the automatic dialing subscription information of the user being off-hook after receiving an off-hook event reported by the MG; determining whether a timeout parameter contained in the automatic dialing subscription information is greater than 0; if the timeout parameter is greater than 0, delivering the dial tone subscription information of the user being off-hook to the MG, and the MG playing the dial tone subscription information for the user being off-hook; and if the timeout parameter is not greater than 0, initiating a call to a destination address indicated by the automatic dialing subscription information.

12. The method of claim 11, wherein said delivering the dial tone subscription information of the user being off-hook to the MG comprises:
converting the format of the dial tone subscription information of the user being off-hook to a format that may be processed by the MG, and delivering the dial tone subscription information converted to the MG.

13. The method of claim 11, wherein the service implementing server further starts a timer when receiving the off-hook event reported by the MG if the timeout parameter contained in the automatic dialing subscription information is greater than 0; and
the method further comprises:
after the MG plays the dial tone subscription information for the user being off-hook,
stopping performing the dial tone subscription service, and initiating the call to the destination address indicated by the automatic dialing subscription information when the timer times out.

14. The method of claim 11, wherein the service implementing server further starts a timer when receiving the off-hook event reported by the MG if the timeout parameter contained in the automatic dialing subscription information is greater than 0; and
the method further comprises:
after the MG plays the dial tone subscription information for the user being off-hook,
determining whether the user dials a number before the timer times out; if the user dials a number, stopping performing the dial tone subscription service, and initiating the call to the destination address indicated by the number; and if the user does not dial a number, stopping performing the dial tone subscription service, and initiating the call to the destination address indicated by the automatic dialing subscription information when the timer times out.

15. The method of claim 1, wherein the information of the service triggered by off-hook comprises dial tone subscription information and automatic dialing subscription information;
the user subscribing to the service triggered by off-hook on the AS comprises the SIP user; and
said carrying out the operation of the service triggered by off-hook according to the information of the service triggered by off-hook comprises:
transparently transmitting the dial tone subscription information and the automatic dialing subscription information to an SIP terminal;
recording the dial tone subscription information and the automatic dialing subscription information; and
determining whether the timeout parameter contained in the automatic dialing subscription information is greater than 0 after the user is off-hook; if the timeout parameter is greater than 0, playing the dial tone subscription information for the user being off-hook; and if the timeout parameter is not greater than 0, initiating the call to a destination address indicated by the automatic dialing subscription information.

16. The method of claim 15, wherein the SIP terminal further starts a timer when the user is off-hook if the timeout parameter contained in the automatic dialing subscription information is greater than 0; and
the method further comprises:
after playing the dial tone subscription information for the user being off-hook,
stopping performing the dial tone subscription service when the timer times out, and initiating the call to the destination address indicated by the automatic dialing subscription information.

17. The method of claim 15, wherein the SIP terminal further starts a timer when the user is off-hook if the timeout parameter contained in the automatic dialing subscription information is greater than 0; and
the method further comprises:
after playing the dial tone subscription information for the user being off-hook,
determining whether the user dials a number before the timer times out; if the user dials a number, stopping performing the dial tone subscription service, and initiating the call to the destination address indicated by the number; and if the user does not dial a number, stopping performing the dial tone subscription service when the timer times out, and initiating the call to the destination address indicated by the automatic dialing subscription information.

18. A system for implementing a service triggered by off-hook, comprising:
an Application Server (AS), adapted to send a SUBSCRIBE message of a Session Initiation Protocol (SIP) signaling to a service implementing server, wherein the SUBSCRIBE message carries information of a service triggered by off-hook which is subscribed by a user on the AS; and a service implementing server, adapted to receive the information of the service triggered by off-hook and carrying out an operation of the service triggered by off-hook according to the information of the service triggered by off-hook when the user is off-hook;

wherein the service implementing server is further adapted to determine that the user who has subscribed to the service triggered by off-hook is an MG user or an SIP user, according to user configuration data stored by the service implementing server, including user type information after receiving the SUBSCRIBE message of the SIP signaling; to record the information of the service triggered by off-hook carried in the SUBSCRIBER message in its own internal data if the user is a Media Gateway (MG) user; and to transparently transmit the information of the service triggered by off-hook carried in the SUBSCRIBER message to an SIP terminal if the user is an SIP user, so that the SIP terminal records the information of the service triggered by off-hook.

19. The system of claim 18, wherein the AS comprises:
means for configuring a string for carrying information related to the service triggered by off-hook in the SUBSCRIBE message of the SIP signaling;
means for carrying the information of the service triggered by off-hook to the string configured in the SUBSCRIBE message of the SIP signaling; and
means for sending the SUBSCRIBE message of the SIP signaling to the service implementing server.

20. The system of claim 18, wherein the service implementing server comprises a Soft Switch (SS) in a Next Generation Network (NGN) and an Access Gateway Control Function (AGCF) in an IP Multimedia Subsystem (IMS).

21. The system of claim 18, wherein the information of the server triggered by off-hook comprises dial tone subscription information; and
if the user subscribing to the service triggered by off-hook on the AS is the MG user; the server implementing server comprises:
means for querying an internal data table for recording the dial tone subscription information to acquire the dial tone subscription information of the user being off-hook; and
means for sending the dial tone subscription information of the user being off-hook to the MG, which plays the stone subscription information to the user being off-hook.

22. The system of claim 21, wherein the service implementing server further comprises:
means for converting the format of the dial tone subscription information of the user being off-hook to a format that may be processed by the MG, and delivering the dial tone subscription information to the MG.

23. The system of claim 18, wherein the information of the server triggered by off-hook comprises dial tone subscription information; and
if the user subscribing to the service triggered by off-hook on the AS is the SIP user, the system further comprises:
an SIP terminal, for recording the dial tone subscription information, and for playing the dial tone subscription information recorded for the user being off-hook; and
the server implementing server comprises:
means for transparently transmitting the dial tone subscription information to the SIP terminal.

24. The system of claim 18, wherein the information of the server triggered by off-hook comprises automatic dialing subscription information; and
if the user subscribing to the service triggered by off-hook on the AS is the MG user, the server implementing server comprises:
means for querying an internal data table for recording the automatic dialing subscription information to acquire the dial tone subscription information of the user being off-hook and initiating a call to a destination address indicated by the automatic dialing subscription information.

25. The system of claim 24, wherein the server implementing server further comprises:
a timer, for setting a timeout parameter, wherein
means for querying an internal data table is further used for determining whether the user dials a number before the timer times out; and initiating a call to a destination address indicated by the number, or initiating a call to a destination address indicated by the automatic dialing subscription information.

26. The system of claim 18, wherein the information of the server triggered by off-hook comprises automatic dialing subscription information;
if the user subscribing to the service triggered by off-hook on the AS is the SIP user, the system further comprises:
an SIP terminal, configured for initiating a call to a destination address indicated by the automatic dialing subscription information; and
the server implementing server comprises:
means for transparently transmitting the automatic dialing subscription information to the SIP terminal.

27. The system of claim 26, wherein the SIP terminal further comprises:
a timer, for setting a timeout parameter; and
means for determining whether the user dials a number before the timer times out and for initiating a call to a destination address indicated by the number, or initiating a call to a destination address indicated by the automatic dialing subscription information.

28. The system of claim 18, wherein the information of the server triggered by off-hook comprises dial tone subscription information and automatic dialing subscription information;
if the user subscribing to the service triggered by off-hook on the AS is the MG user, the server implementing server comprises:
means for querying an internal data table for recording the dial tone subscription information and the automatic dialing subscription information to acquire the dial tone subscription information and automatic dialing subscription information of the user being off-hook, determining whether a timeout parameter in the automatic dialing subscription information is greater than 0, and delivering the dial tone subscription information of the user being off-hook to an MG or initiating a call to a destination address indicated by the automatic dialing subscription information.

29. The system of claim 28, wherein the server implementing server further comprises:
means for converting the format of the dial tone subscription information of the user being off-hook to a format that may be processed by the MG, and delivering the dial tone subscription information converted to the MG.

30. The system of claim 28, wherein the server implementing server further comprises:
a timer, for setting a timeout parameter; and
the server implementing server comprises:

the means for querying an internal data table is further used for determining whether the user dials a number before the timer times out; and initiating a call to a destination address indicated by the number, or initiating a call to a destination address indicated by the automatic dialing subscription information.

31. The system of claim 18, wherein the information of the server triggered by off-hook comprises dial tone subscription information and automatic dialing subscription information; and if the user subscribing to the service triggered by off-hook on the AS is the SIP user, the system further comprises:

an SIP terminal, recording the dial tone subscription information and the automatic dialing subscription information, determining whether a timeout parameter in the automatic dialing subscription information is greater than 0, and playing the dial tone subscription information recorded for the user being off-hook or initiating a call to a destination address indicated by the automatic dialing subscription information; and the server implementing server comprises:

means for transparently transmitting the dial tone subscription information and the automatic dialing subscription information to the SIP terminal.

\* \* \* \* \*